United States Patent
Subramaniam et al.

(10) Patent No.: US 9,454,628 B1
(45) Date of Patent: *Sep. 27, 2016

(54) SCALING MEMORY COMPONENTS OF INTEGRATED CIRCUIT DESIGN

(71) Applicant: eSilicon Corporation, San Jose, CA (US)

(72) Inventors: Prasad Subramaniam, New Providence, NJ (US); Hao Nham, Millington, NJ (US); Rakesh Chadha, Berkeley Heights, NJ (US); Ferran Martorell, Barcelona (ES)

(73) Assignee: eSilicon Corporation, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/678,702

(22) Filed: Apr. 3, 2015

Related U.S. Application Data

(63) Continuation of application No. 14/677,206, filed on Apr. 2, 2015.

(51) Int. Cl.
*G06F 17/50* (2006.01)

(52) U.S. Cl.
CPC .................. *G06F 17/505* (2013.01)

(58) Field of Classification Search
CPC .............. G01R 31/31864; G06F 17/5022; G06F 17/5045; G06F 2217/12; G06F 2217/14; G06F 2217/78; G06F 17/505
USPC .................. 716/100–104, 106–109, 132–136
See application file for complete search history.

(56) References Cited

U.S. PATENT DOCUMENTS

| | | | | |
|---|---|---|---|---|
| 7,716,609 B1 * | 5/2010 | Taheri | .................. | G06F 17/505 716/135 |
| 2011/0023004 A1 * | 1/2011 | Rao | ........................ | G06F 1/3203 716/136 |

OTHER PUBLICATIONS

Christie, P., "IMEC's VCA Technology Targeting Services," IMEC, Oct. 18, 2011, pp. 262-276. Part of the TSMC'S Open Innovation Platform Ecosystem Forum <http://www.tsmc.com/english/24papers.htm>.

* cited by examiner

*Primary Examiner* — Paul Dinh
(74) *Attorney, Agent, or Firm* — Fenwick & West LLP

(57) ABSTRACT

In one aspect, a method for providing design point recommendations for an integrated circuit (IC) design is disclosed. The method comprises receiving an IC design along with a reference PPA (power, performance, area) metric at a reference design point, and a target PPA metric. The method also comprises estimating trial PPA metrics for the IC design at multiple design points, wherein estimating trial PPA metric at each design point includes accessing a PPA database containing PPA metrics for multiple test components, determining scale factors from the reference design point to the trial design point for test components equivalent to components of the IC design, and applying the scale factors to the reference PPA metric to determine the trial PPA metric for the trial design point. The method further comprises recommending a trial design point based on the estimated trial PPA metric and the received target PPA metric.

20 Claims, 9 Drawing Sheets

612    600

| Data | Scale Factors | Summary | Matrix | Series | Active Power | Total Power |

610 →

620 →
| Technology | CLN28HPM ▼ |
| Vendor | TSMC ▼ |
| Tracks | 9 ▼ |
| | Update Form |

CLN28HPM TSMC 9 Tracks

630 →

| | | | | |
|---|---|---|---|---|
| L=30.6nm | SVT | 0 | % | |
| | LVT | 0 | % | |
| | ULVT | 0 | % | |
| (default) L=35nm | UHVT | 0 | % | |
| | HVT | 0 | % | |
| | SVT | 0 | % | |
| | LVT | 0 | % | |
| | ULVT | 0 | % | |
| L=38.4nm | SVT | 0 | % | |
| | LVT | 0 | % | |
| | ULVT | 100 | % | |

| | Power ☐ Default | Frequency ☐ Default |
|---|---|---|
| PVT | FF ▼ 0.99 V 125 C | SS ▼ 0.81 V -40 C |
| Reference PVT | FF ▼ 0.99 ▼V 125 ▼C | SS ▼ 0.81 ▼V -40 ▼C |
| | Calculate | |

640 →
| Active Power Scale Factor | 1.000 | |
| Leakage Power Scale Factor | 1.000 | |
| Frequency Scale Factor | | 1.000 |

SCALING MEMORY COMPONENTS OF INTEGRATED CIRCUIT DESIGN

CROSS REFERENCE TO RELATED APPLICATION

This application is a continuation of U.S. patent application Ser. No. 14/677,206 titled "Integrated Circuit Design Optimization," filed Apr. 2, 2015, which is incorporated by reference in its entirety.

BACKGROUND

1. Field of the Invention

This invention relates generally to the optimization of integrated circuit (IC) designs.

2. Description of Related Art

Integrated circuits and their designs are getting more and more complex. A typical design cycle may last a year or more and costs millions of dollars. With a long and expensive design cycle, it is important to make appropriate choices for, among others, process technology and standard cell library.

Traditionally, process technology and cell library are selected manually based on past experience. However, such a selection may not actually be the optimal design point for a particular IC design. This is especially true as the complexity of IC designs increases because, for complex designs, it may be more difficult to determine which design points are optimal, particularly as the number of possible design points also increases.

In addition, as the complexity of IC designs continues to increase, the cost and time associated with fabricating such complex IC designs also increases, thus magnifying the effects of an incorrect choice of process technology and/or library.

Therefore, it is important to be able to estimate the performance of IC designs before fabricating the IC and also to be able to optimize the design based on the estimated performance. It is also important to be able to optimize the performance of the IC design by picking appropriate options for process technology and library.

SUMMARY

In one aspect, the present invention overcomes the limitations of the prior art by disclosing approaches for providing design point recommendations for an IC design before the actual implementation of the design. The method provides the recommendations based on an optimization of the IC design by automatically selecting appropriate design points (e.g., process technology and/or library) for the IC design in order to meet or exceed a target PPA (power, performance, and area) metric.

In one embodiment, the following are received by software: the IC design of interest, the desired value of the PPA metric (aka, the target PPA metric), and the value of the PPA metric evaluated at a reference design point (aka, the reference PPA metric). Trial PPA metrics for the IC design are estimated at multiple design points. This is done by scaling the reference PPA metric from the reference design point to the trial design point. In one approach, a PPA database contains PPA metrics for multiple test components. Scale factors from the reference design point to the trial design point are determined for test components that are equivalent to components of the IC design. These scale factors are applied to the reference PPA metric to determine the trial PPA metric for the trial design point. One or more of the trial design points are recommended based on the estimated trial PPA metrics compared to the target PPA metric.

Other aspects include different approaches to scaling individual components, including for different types of components such as logic component and memory components. Another aspect includes different approaches to scaling IC designs, such as an SoC, which contains many individual components. Yet another aspect includes iterative optimization of the design point. Yet another aspect includes approaches to scaling an IC design represented at a high level of abstraction where a logic portion of the IC design is specified as gate count and a memory portion is specified as actual memory components.

Other aspects include components, devices, systems, improvements, methods, processes, applications and other technologies related to any of the foregoing.

BRIEF DESCRIPTION OF THE DRAWINGS

FIG. 6 is a screen shot illustrating PVT logic scaling, according to one embodiment.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
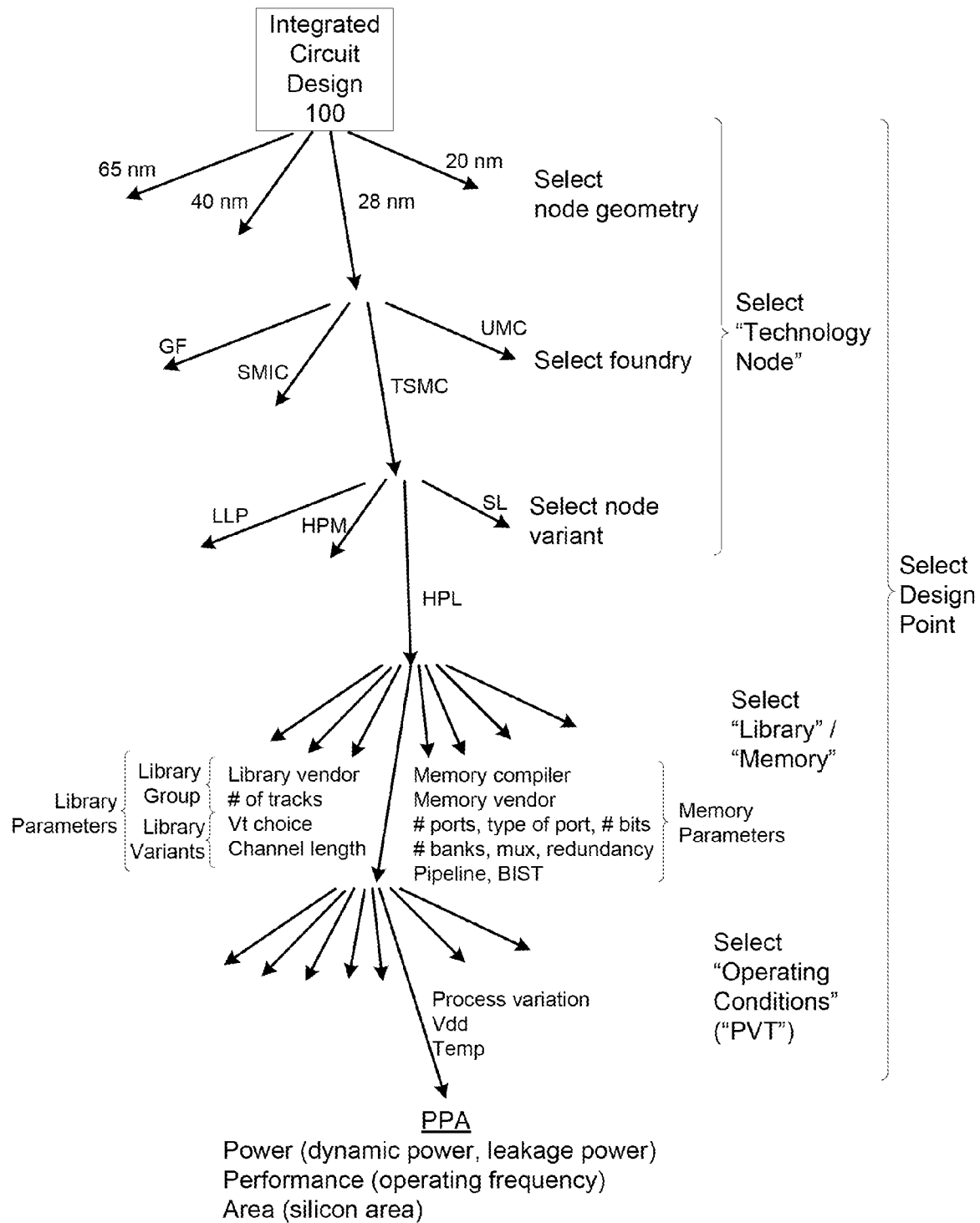
FIG. 1 is a decision tree showing different design points for a digital integrated circuit ("IC"), according to one embodiment.

FIG. 1 is a decision tree showing different design points for a digital integrated circuit (IC) design 100, according to one embodiment. A design point of the decision tree includes a plurality of parameters associated with optimizing the IC design. The plurality of parameters can be organized into categories such as technology node parameters, library/memory parameters (depending on the type of component), and operating conditions parameters.

Technology node parameters include parameters for selecting a node geometry, a foundry, and a node variant. Node geometry generally represents a minimum transistor gate length of a process technology used for manufacturing semiconductor circuits. For example, node geometry for TSMC 45 nm process technology is 45 nm, which represents the smallest possible gate length of transistors for that process technology. Example node geometries include 90 nm, 65 nm, 45 nm, 28 nm, 22 nm, etc. Foundry is a company that fabricates semiconductor circuits. Example foundries include Taiwan Semiconductor Manufacturing Corporation (TSMC), Semiconductor Manufacturing International Corporation (SMIC), Global Foundries (GF), UMC, etc. A node variant is a variation of the process technology, typically where some of the properties of the transistors are optimized for at least one of power, performance, or die area (herein after referred to as "PPA") metrics. Example node variants for the TSMC 28 nm process include low power ("LP"), high performance ("HP"), high performance mobile computing ("HPM"), etc. Some other example node variants include general purpose (G/GP), low voltage (LV), low power with performance (LPP), low power early (LPE), high performance with low power (HPL), super low power (SLP), high performance plus (HPP), FinFet process Plus with low leakage (FPLL), FinFet process with low leakage power (FFLL), General purpose FinFet process with low power (FFGL), and FinFet process plus with low power (FPLL).

Library parameters can include a separate set of parameters for logic libraries. The set of logic parameters include parameters for the library vendor, number of tracks, threshold voltage choice, body bias, and channel length. Library vendor represents a provider of the particular libraries. Example library vendors include ARM, Dolphin, TSMC, etc. Number of tracks represents a number of horizontal tracks that can be used for routing. For example, for a given technology node, libraries might be available in 7-track, 8-track, or 9-track variations. Threshold voltage represents a minimum voltage to be applied between gate and source terminals to create a conducting path between source and drain terminals. For example, a typical advanced node process includes MOS transistors with low, nominal and high threshold voltages. An exemplary 40 nm process includes NMOS transistors with threshold voltages such as 0.045V, 0.1V, and 0.15V for the low VT, standard VT and high VT device respectively. It is understood that the threshold voltage varies with device size and the above-listed exemplary values are for one specific device size. Channel length represents a minimum distance between source and drain terminals of a MOS transistor. An exemplary advanced node CMOS process includes MOS transistors with short, standard and long channel length transistors.

Memory parameters can include memory compilers, number of ports, type of port (read/write), number of words in memory, number of bits per word, mux (how the words are organized), banks (how a memory sub array is organized), redundancy—provides additional rows or columns in the memory array for repair, pipeline—enables pipelining of memory output, BIST—includes Built-In-Self-Test logic or hooks to such test logic, and power management features that enable the memory to conserve power when not in operation.

Operating condition parameters include parameters for estimating a performance of the IC design at various possible operating conditions. Such operating condition parameters can represent process, voltage, and temperature (also known as "PVT"). Process represents the possible variations of the process technology when the IC design is being manufactured. The possible variations of MOS transistors, capacitors, resistors, etc., are represented by process corners. Example process corners include SS (slow NMOS and slow PMOS transistors), FF (fast NMOS and fast PMOS transistors), and TT (typical NMOS and typical PMOS transistors).

Voltage represents a supply voltage ("VDD") of the IC design that can further represent a maximum amount of voltage available for a signal that is processed by the IC design. For example, when the reference voltage of the IC design is a ground that is assigned zero volts, a value of VDD represents the supply voltage. Even though VDD is designed to be a fixed number (e.g., 1V), the value of VDD varies due to many factors and VDD typically has some variation such as +/−10%. For example, when VDD is designed to have a nominal value of 1V, VDD values can be as low as 0.9V and as high as 1.1V. Temperature parameter represents a junction temperature for the operation of the IC design. Depending on the application of the IC design, the IC design should meet or exceed its performance specification over a range of junction temperatures. For example, a common range of junction temperature specification is between −40° C. to +125° C.

The IC design 100 is optimized, in part by picking an appropriate combination of various parameters (a design point), such that estimated PPA metrics at the design point will meet or exceed a PPA target. Exemplary PPA metrics include power consumption (e.g., dynamic power and leakage power), performance (e.g., operating frequency), and silicon die area for manufacturing the IC design. A design point does not have to include all of the parameters shown. For example, earlier in the design process, the design point might include a fewer number of more significant parameters. Later in the design process, the design point might include a larger number of parameters. The design point also is not limited to the specific parameters shown.

Figure 2:
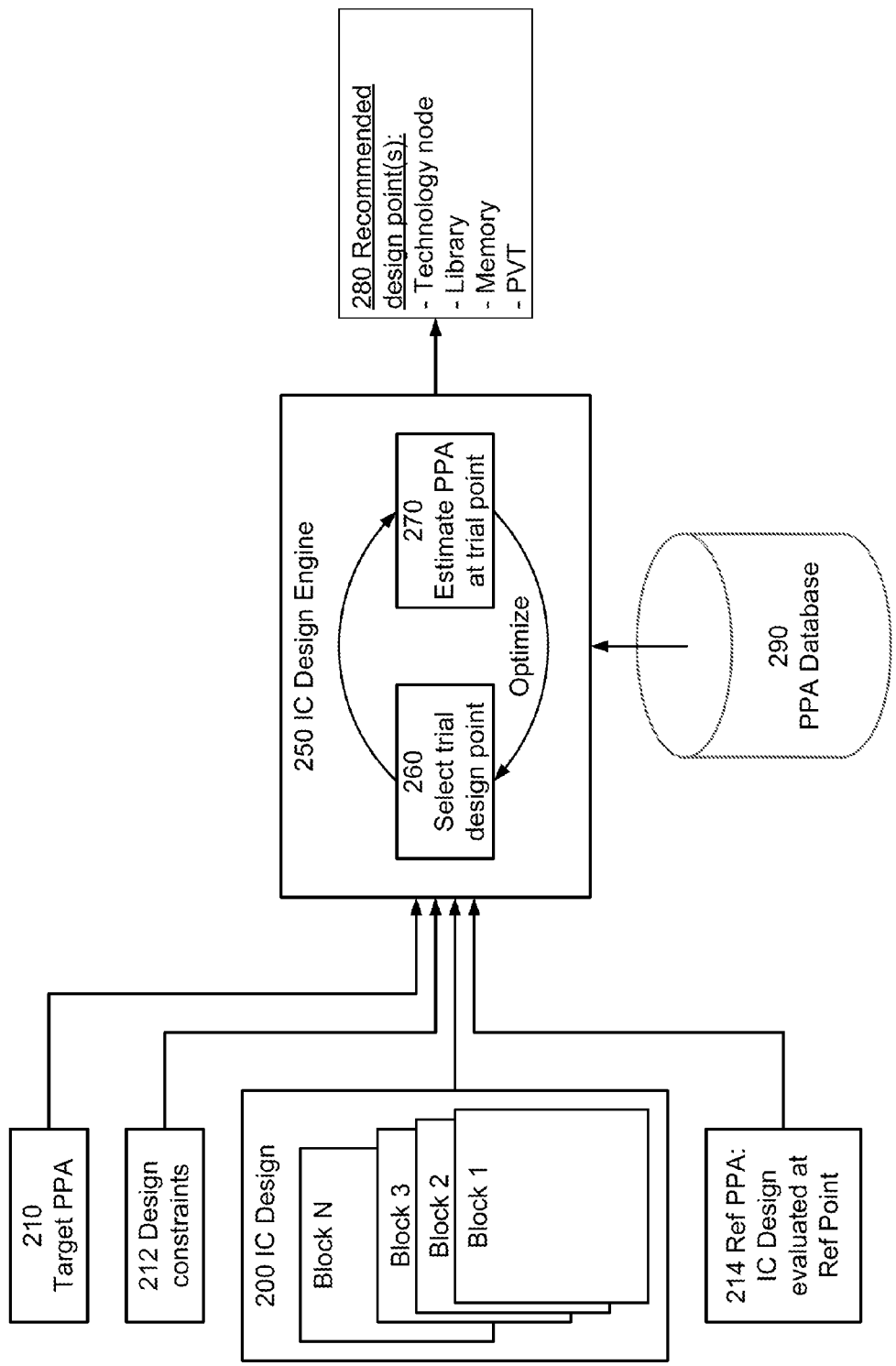
FIG. 2 is a block diagram illustrating a design engine that recommends design point(s) for a digital IC design, according to one embodiment.

FIG. 2 is a block diagram illustrating a design engine that recommends design point(s) for a digital IC design, according to one embodiment. FIG. 2 shows IC design engine 250 that receives an IC design 200 along with reference PPA metric 214, a target PPA metric 210, and design constraints 212. The IC design engine processes the received information and uses information available in PPA database 290 to provide recommended design point(s) 280 as an output of the IC design engine.

The IC design is a design for which a user is expecting the IC design engine to recommend appropriate design points that meet or exceed target PPA metric 210. The received IC design can be a synthesized netlist or an RTL-level description. In one embodiment, the received IC design is a design for a system-on-chip (SoC). The IC design typically includes a plurality of blocks, for example, Blocks 1 through N. Each block of the plurality of blocks can comprise a plurality of sub-blocks and/or circuit components, including one or more logic components and one or more memory components as shown below in FIG. 3.

In one embodiment, an IC design block is defined as a portion of the IC design where the entire block uses the same library group. In this exemplary embodiment, a library group is defined to include a group of design points with a specific technology node, a specific library vendor, and a specific number of routing tracks. For example, all the library variants within a 40 nm TSMC LP process with a Dolphin library with 9-tracks is considered to be a library group. Each library group can include several library variants. A library variant can include different combinations of parameters such as channel length and threshold voltage. More generally, a library group can be defined as the set of libraries that are "compatible" with each other when implementing an IC design block. That is, the group of library variants that can be mixed when implementing an IC design block is referred to as a library group. In one embodiment, library groups are pre-determined and different library groups can be chosen for each IC design block.

Reference PPA metric 214 is also received along with the IC design. Reference PPA metric 214 is determined by evaluating the IC design at a reference design point. For example, the IC design is evaluated by passing it through a more complete digital design flow at the reference design point. The reference design point typically includes a value for each of the technology node parameters, library/memory parameters, and operating conditions parameters. In one embodiment, the reference design point is at standard PVT conditions. Alternatively, the reference design point is at PVT conditions other than at standard PVT conditions.

The target PPA metric 210 is a PPA metric that the user wants the IC design to meet or exceed, as the IC design engine is estimating PPA metrics for the IC design 200 at various design points. That is, the IC design engine uses the target PPA metric 210 to determine whether a particular design point is to be recommended for the IC design. Target PPA metric 210 can include at least one of a power metric, a performance metric, and an area metric. For example, the power metric can include dynamic power consumption and/or leakage power consumption of the IC design. The performance metric can include, for example, an operating frequency of the IC design. The area metric can include, for example, a silicon die area for the IC design. In one embodiment, target PPA metric 210 includes all metrics associated with power, performance, and area. Alternatively, target PPA metric 210 includes one of either a power metric, a performance metric, or an area metric. Yet in another embodiment, target PPA metric 210 includes any two metrics associated with power, performance, and area.

Design constraints 212 can include one or more conditions on the design points. For example, design constraints 212 can include a condition that a range of allowed supply voltage for the IC design should be +/−10% from the nominal value. Accordingly, the IC design engine would apply the condition on supply voltage as an additional criterion in addition to optimizing the parameters used for each design point in complying with the target PPA metric 210. For example, the IC design engine might only consider design points that have a supply voltage variation of less than or equal to +/−10% as specified by design constraints 212. It is understood that design constraints 212 can specify conditions on any of the parameters, as described above with reference to FIG. 1, associated with technology node parameters, library/memory parameters, and operating conditions parameters. The design constraints 212 can also specify other conditions. For example, design constraints 212 can include a target operating frequency that is typically specified as a timing constraint on the design.

The IC design engine 250 receives the IC design 200 along with a reference PPA metric 214 evaluated at a reference design point. The IC design engine 250 also receives any applicable design constraints 212. To provide recommended design point(s) 280, the IC design engine 250 optimizes the design points. In the example of FIG. 2, the design engine 250 selects 260 a trial design point and estimates 270 the PPA metric of the IC design at the selected trial design point. The trial design point can be any design point in the available design space.

In one exemplary embodiment, the IC design engine 250 iteratively optimizes the design point. It selects 260 a trial design point and then estimates 270 the PPA metric at the selected trial design point. Based on the estimates 270, the IC design engine 250 iterates 260 the trial design point by varying one or more parameters associated with optimizing the IC design and then recalculates 270 the PPA metric. This iteration continues until a suitable design point is determined and recommended 280.

In another exemplary embodiment, the IC design engine 250 repeats the process of selecting 260 a trial design point and estimating 270 the PPA metric at the selected trial design point for all applicable design points. That is, the IC design engine 250 explores the possible design space by performing an exhaustive search. The IC design engine 250 then recommends 280 design points based on the exhaustive search. In one variation, the IC design engine 250 samples the design space but does not necessarily estimate 270 the PPA metric for every possible design point.

The IC design engine estimates 270 the PPA metric at each selected trial design point by referring to PPA database 290. The reference PPA metric 214 is typically evaluated at the reference design point by using a more complete or accurate method than the one used by IC design engine 250. For example, the reference PPA metric 214 may be evaluated by passing the IC design through a complete design flow. In comparison, the IC design engine 250 uses the information in PPA database 290 to determine scale factors for scaling from the reference design point to the trial design point. These scale factors are applied to the reference PPA metric 214 to estimate the trial PPA metric 270.

PPA database 290 is a database that includes data associated with PPA metrics of multiple test components evaluated at multiple design points. Consider logic components as an example, although similar remarks apply to memory or other components. The design points at which the PPA metrics are evaluated preferably include a sufficient sampling of values for technology node parameters (i.e., node geometry, foundry, and node variants), library groups (e.g., library vendors and number of tracks), library variants (e.g., threshold voltage and channel length), and PVT conditions. For example, a test component such as a 32-bit multiplier can be evaluated at different design points in a design space that spans all of the parameters described in FIG. 1. Test components are circuits (e.g, logic in this example) at either transistor-level, gate-level, and/or block-level that are evaluated for various PPA metrics at different design points in the design space. The test components are evaluated before receiving the IC design 200. That is, PPA database 290 is constructed a priori.

The data of the PPA database includes a value of an evaluated PPA metric that is evaluated at different design points for the test components. For example, if each of the ten parameters of the design points described in FIG. 1 are sampled at two different values, there would be a total of 1024 (i.e., $2^{10}$) possible design points represented in the PPA database. The exemplary test component, a 32-bit multiplier, has a PPA metric for each of power, performance, and area. For this exemplary case, the PPA database includes 1024 values for each of power, performance, and area PPA metric for the 32-bit multiplier for the 1024 possible design points. Similarly, the PPA database includes evaluated PPA metrics for other test components. Data included in the PPA database is generated at a time prior to receiving the IC design such that all data associated with PPA database is already available when the IC design engine receives the IC design. Although this example concerns logic, the PPA database 290 includes data associated with both logic and memory as described below in detail with reference to FIGS. 4-8.

Continuing the logic example, after selecting 260 a trial design point, the IC design engine 250 identifies one or more test components in the PPA database 290, that are equivalent to the logic in the received IC design, at least for purposes of estimating the PPA metric. The design engine 250 accesses the PPA database 290 for the evaluated PPA metrics of the identified test components at the selected trial design point. The design engine determines scale factors for the one or more test components, for scaling from the reference design point to the trial design point. The design engine estimates trial PPA metric of the received IC design by applying the determined scale factors to the reference PPA metrics of the received IC design.

In one embodiment, the design engine estimates trial PPA metric of the received IC design at a block-level. That is, the design engine implements estimating of trial PPA metric of the IC design for each block of the plurality of blocks of the IC design, and later combines the trial PPA metrics of each block to generate an estimate for trial PPA metric of the entire IC design for the selected trial design point. The process of estimating trial PPA metric at a block-level is described below in FIGS. 3-8.

The design engine 250 generates recommended design point(s) 280 based on the estimated trial PPA metric at each selected trial design and the received target PPA metric. For example, if the target metric is for a target silicon die area, the design engine would recommend trial design points based on whether the estimated silicon die area that is less than or equal to the target die area. If the target metric is for a target operating frequency, the design engine would recommend trial design points based on whether the estimated operating frequency is greater than or equal to the target operating frequency. And if the target metric is for a target power consumption (leakage or dynamic), the design engine would recommend trial design points based on whether the estimated power consumption is less than or equal to the target power consumption.

The recommended design points can also be based on the received design constraints 212. For example, the recommended design points can be based on design constraints associated with at least one of: foundry manufacturers, node geometries, and library vendors.

In one embodiment, the recommended design point includes a trial design point that meets or exceeds the target PPA. Alternatively, the recommended design points include all trial design points that meet or exceed the target PPA. The recommended design point is output in the form of a table. Each entry in the table corresponds to a design point and includes the PPA metrics associated with that design point. Each design point of the recommended design points can include all parameters described above with reference to FIG. 1. In one embodiment, each design point of the recommended design points includes all ten parameters associated with technology node parameters, library/memory parameters, and operating conditions parameters described in FIG. 1. Alternatively, each design point of the recommended design points includes a subset of all ten parameters described in FIG. 1. For example, each design point of the recommended design points can include one or more of: foundries, node geometries, node variants, library vendors, number of tracks, threshold voltage, channel length, and operating conditions including process, voltage, and temperature. These parameters are for logic components. Since the IC design usually contains both memory and logic, each design point will typically also include memory parameters in addition to the standard cell library parameters. Design parameters other than those shown in FIG. 1 can also be used.

Figure 3:
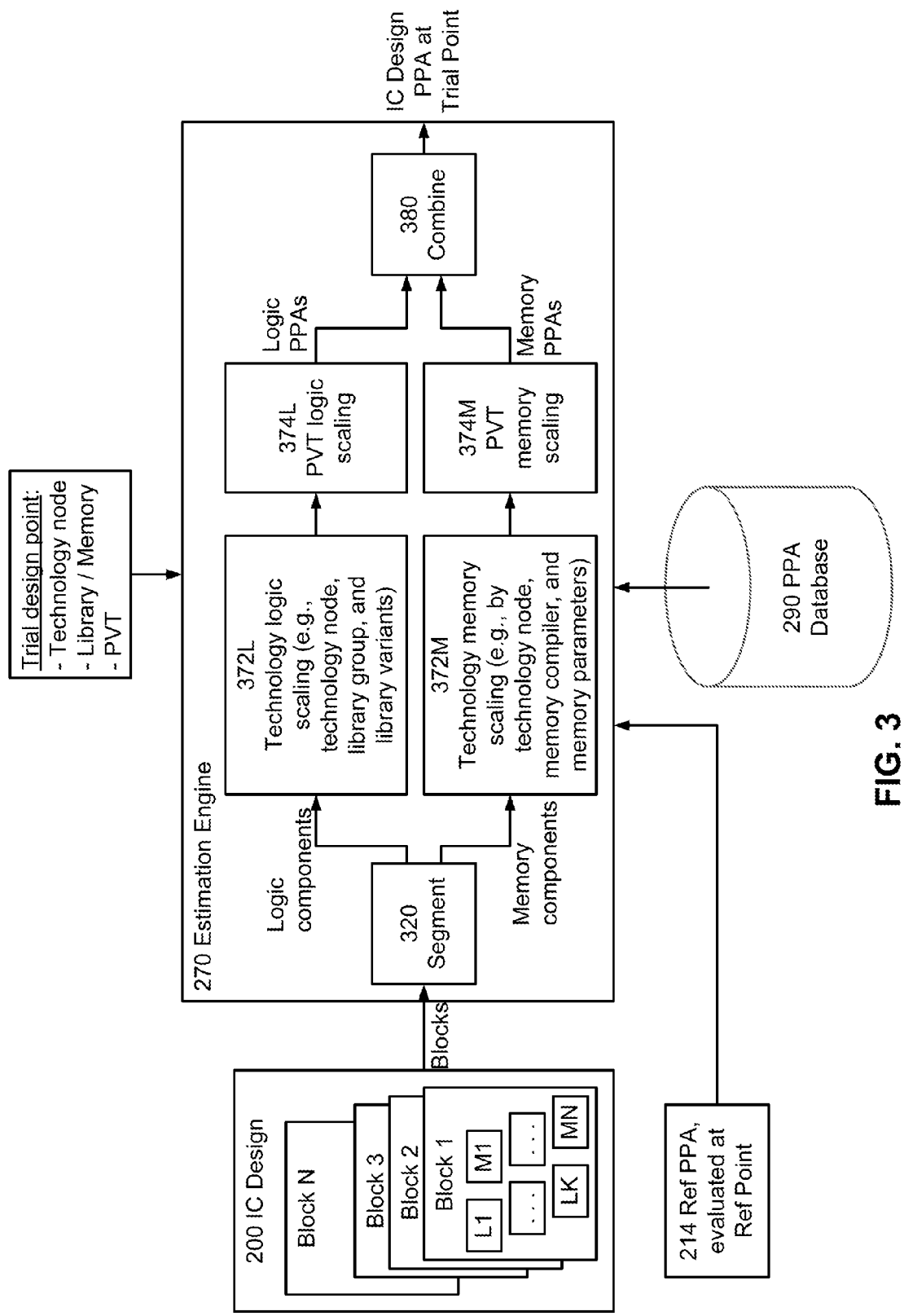
FIG. 3 is a block diagram of the estimation engine shown in FIG. 2, according to one embodiment.

FIG. 3 is a block diagram of the estimation engine 270 shown in FIG. 2, according to one embodiment. FIG. 3 shows estimation engine 270 that receives blocks of the IC design to estimate a trial PPA metric at a selected trial design point. In addition to receiving blocks of IC design, estimation engine 270, as discussed above with reference to FIG. 2, also receives a reference PPA 214 evaluated at a reference design point and the trial design point at which the trial PPA is to be estimated. The estimation engine estimates trial PPA metrics for IC design blocks using a number of modules such as segmentation module 320, technology logic scaling module 372L, PVT logic scaling module 374L, technology memory scaling module 372M, PVT memory scaling module 374M, and combiner module 380.

The term "module" is not meant to be limited to a specific physical form. Depending on the specific application, modules can be implemented as hardware, firmware, software, and/or combinations of these. In some embodiments, the modules are implemented as dedicated circuitry (e.g., part of an ASIC), in order to take advantage of lower power consumption and higher speed. Alternatively, the modules can be implemented as software, typically running on digital signal processors or even general-purpose processors. Various combinations can also be used. For example, certain operations, like reading and writing from the PPA database, may be common enough as to be available as standard components, software, or circuit designs. These may be combined with customized implementations of the remainder of the estimation engine. Furthermore, different modules can share common components or even be implemented by the same components. There may or may not be a clear boundary between different modules. In this example implementation, the modules shown are implemented as software modules.

Segmentation module 320 receives an IC design block and partitions it into one or more logic components and one or more memory components. The IC design comprises a plurality of blocks as described above with reference to FIG. 1. Each block of the IC design can further comprise a plurality of circuit components. Circuit components can include logic components and/or memory components. For example, Block 1 of FIG. 3 comprises K logic components labelled L1-LK and N memory components labelled M1-MN. One method of partitioning preserves the inherent partitioning of the IC design block into logic and memory components that is already present in the IC design block. This inherent partitioning is defined, for example, in the RTL or netlist of the IC design block.

The estimation engine estimates trial PPA for each IC design block (trial block-level PPA metric) by estimating trial component-level PPA metrics for the circuit components at the trial design point. Modules 372L and 374L estimate trial component-level PPA metrics for logic components, and modules 372M and 374M estimate trial component-level PPA metrics for memory components. The engine then combines (e.g., via combiner module 380) the estimated trial logic PPAs and the trial memory PPAs to generate an estimated trial block-level PPA and/or an estimated trial PPA metric for the entire IC design at the trial design point.

The logic components are passed through scaling processes to estimate the PPA metrics of the logic components at the trial design point, based on the known PPA metric at the reference design point. The scaling process between the reference and trial design points can be implemented by selecting an appropriate test component whose PPA metrics have already been evaluated at different design points. The scaling of the logic components is implemented by passing it through technology logic scaling module 372L and PVT logic scaling module 374L to estimate a trial logic PPA for each logic component. In one embodiment, technology logic scaling accounts for any differences in one or more of the technology node parameters (i.e., node geometry, foundry, and node variants), library groups (e.g., library vendors and number of tracks), and library variants (e.g., combinations of channel length and threshold voltage for a given library group). PVT logic scaling accounts for any differences in operating conditions (i.e., PVT conditions). In other words, technology logic scaling first performs logic scaling of the logic components with respect to changes in technology node parameters, library groups, and library variants, and PVT logic scaling then performs logic scaling with respect to changes in PVT conditions. The trial logic PPAs from technology and PVT logic scaling are combined to generate estimated trial block-level logic PPAs for the IC design block.

The technology logic scaling module 372L selects one or more technology logic test components (from PPA database 290) based on a similarity between the logic components of the IC design block and the technology logic test components. The logic components in the IC design typically are not the same components as the test components that are pre-evaluated to generate the PPA database. Typically, the number of different logic components in the IC design (e.g., in a given block or the entire IC design) is greater than the number of different technology logic test components used to generate the PPA database. The process of selecting appropriate technology logic test components is described in detail below with reference to FIG. 4.

Technology logic scaling module 372L accesses the PPA database 290 for identifying the evaluated PPA metrics of the selected technology logic test component at both the reference and trial design points. The module 372L determines a technology logic scale factor for the technology logic test component, for scaling from the reference design point to the trial design point. The technology logic scale factors between different design points in the design space are calculated for each of the technology logic test components before receiving the IC design.

The PVT logic scaling module 374L selects a PVT logic test component based on the technology node parameters and library parameters of the trial design point. For example, if the trial design point specifies TSMC 45 nm HPM (High-Performance Mobile) process with TSMC models having 9-tracks, an appropriate PVT logic test component (e.g., NAND2 gate) that was implemented in the above-specified exemplary technology node parameters and library parameters is selected for PVT logic scaling. The PVT logic scaling module accesses the PPA database 290 for identifying the evaluated PPA metrics of the selected PVT logic test component at the reference and trial design points. The PVT logic scaling module then determines a PVT logic scale factor for the PVT logic test component, for scaling from the reference design point to the trial design point. The process of generating PVT logic scale factors for each logic component of the IC design block is described below in detail with reference to FIG. 5.

The technology and PVT logic scale factors are applied to the reference logic PPAs of the logic components to generate trial logic PPAs for the components at the trial design point.

The memory components of the IC design block are passed through technology memory scaling module 372M and PVT memory scaling module 374M to estimate a trial memory PPA for each memory component. Memory scaling differs from logic scaling in the following manner. Scaling of a logic component is based on a test component from the PPA database that is representative of the actual logic component but that typically is not the actual logic component. Scaling of a memory component is based on scaling the actual memory component itself. That is, the test component from the PPA database is the memory component itself. If the PPA database does not contain the actual memory component, it can be created in real-time and its PPA metrics are generated in real time as well. The process of memory scaling is described below in detail with reference to FIGS. 7 and 8. The technology and PVT memory scale factors determined for the memory components uses a procedure that is different from the procedure used to determine scale factors for the logic components.

The trial component-level PPA metrics estimated by modules 372-374 are combined by combiner module 380 to generate estimated trial logic PPAs for the IC design block. In one approach, for each component of the IC design block, module 380 combines the trial component-level PPA metrics for both logic and memory to obtain trial block-level PPA metrics. These trial block-level PPA metrics can be combined by module 380 to obtain the trial PPA metric for the IC design.

The combination process depends on the PPA metric for which the IC design is optimized for. For example, if the PPA metric is power consumption (either leakage power or dynamic power), the trial power PPA metric for the IC design is estimated by first summing the trial component-level power PPA metrics to obtain trial block-level power PPA metrics and then by summing the trial block-level power PPA metrics to obtain the trial power PPA metric for the entire IC design. If the PPA metric is performance (e.g., operating frequency), the trial performance PPA metric for the IC design is estimated by first selecting the worst-case trial component-level performance PPA metric (i.e., lowest operating frequency at the component-level) to obtain trial block-level performance PPA metric and then by further selecting the worst-case trial block-level performance PPA metric to obtain the trial performance PPA metric for the entire IC design. If the PPA metric is area (i.e., silicon die area), the trial area PPA metric for the IC design is estimated by first summing the trial component-level area PPA metrics to obtain trial block-level area PPA metrics and then by summing the trial block-level area PPA metrics to obtain the trial area PPA metric for the entire IC design.

In one exemplary embodiment, during calculating trial PPA metrics for the IC design and also during recommending design points for the IC design, all blocks are assigned the same node geometry and foundry, but different blocks can be assigned to different library groups. In the above exemplary embodiment, all logic components within a given block are assigned the same library group, but can be assigned different library variants within the library group.

In another variation, PPA metrics are evaluated at an early design stage, when the actual logic design is not yet known. The logic portion of the IC design 200 is represented by a number of logic gates instead of being represented by the actual logic components. That is, the logic portion is represented by a logic gate count at a high level of abstraction. Logic scaling then proceeds as described above, using representative logic test components from the PPA database. The memory portion of the IC design 200 is represented by memory components, as described above, and memory scaling proceeds as described above.

As discussed above with reference to FIG. 2, an IC design block can be defined in part as a circuit of the IC design at a hierarchy level of the IC design where the entire block uses the same library group, where the library group is defined as the set of libraries which have the same technology node, library vendor and number of routing tracks. One method of optimizing blocks of IC design is as follows. First, available libraries are sorted into library groups. In one embodiment, the sorting of the libraries into library groups is predetermined based on the technology node. Next, one or more candidate library groups are selected for each block of the IC design. Each library group includes library variants including different combinations of parameters such as channel length and threshold voltage. One way of selecting candidate library groups for each block is by ensuring that a PPA metric of the block corresponding to at least one library variant in a candidate library group exceeds a target PPA metric for the block. Next, scale factors for PPA metrics are calculated for each of the candidate library groups. Then, PPA metrics for the block are calculated by applying the scale factors corresponding to each candidate library group. Finally, one of the candidate library groups is selected for the block, including accounting for any design constraints 212. For example, if the design constraints include minimizing area PPA, the candidate library group that provides for the smallest estimated area PPA for the block is selected. The design engine can output a table to list all candidate library groups and their corresponding estimated PPA metrics for each block.

In some embodiments, more than one library variant can be used within the same IC design block to achieve optimal PPA metrics for the block. For example, let us assume that a block has N gates, has a target PPA metric of G, and achieves a relative speed up S_UP (compared with a reference design point) with a fast library and a relative slow down S_DN with a slow library. One way to optimize the performance PPA of such an exemplary block is by choosing the fast library for some portion of the gates of the block and choosing the slow library for the remaining portion of the blocks. If the number of gates to be implemented using the fast library is n, the ratio n/N is the portion of the gates implemented in the fast library. An exemplary equation to achieve the target performance is given by:

$$\frac{n}{N} S\_UP + \frac{N-n}{N} S\_DN = G \qquad (1)$$

Solving for n/N yields $$\frac{n}{N} = \frac{G - S\_DN}{S\_UP - S\_DN} \qquad (2)$$

Figure 4:
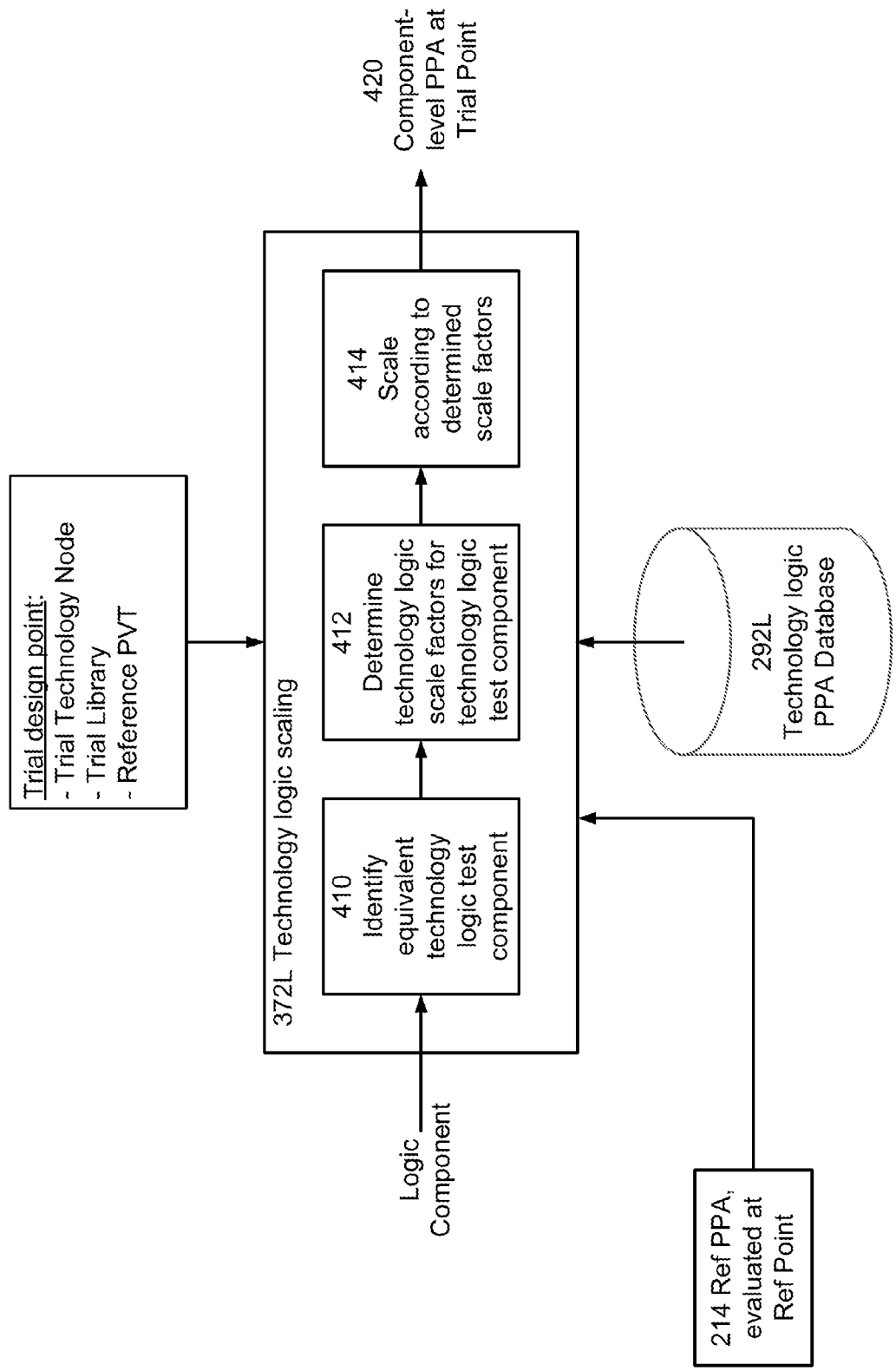
FIG. 4 is a block diagram of the technology logic scaling shown in FIG. 3, according to one embodiment.

FIG. 4 is a block diagram of the technology logic scaling 372L shown in FIG. 3, according to one embodiment. Technology logic scaling module 372L receives a logic component, for which to estimate component-level trial logic PPA metric for the logic component at a trial design point. The technology logic scaling module estimates the component-level trial logic PPA metric by referring to technology logic PPA database 292L. The module also receives a reference PPA metric associated with the received logic component that is based on the reference PPA 214.

In one embodiment, technology logic scaling accounts for differences in one or more of the technology node parameters (i.e., node geometry, foundry, and node variants), library groups (e.g., library vendors and number of tracks), and/or library variants (e.g., channel lengths and threshold voltages). In other words, technology logic scaling performs logic scaling of the logic components over technology node parameters, library groups, and library variants. Accordingly, the trial design point used for technology logic scaling can use the reference design point values for PVT conditions.

The reference design point used in generating reference PPA 214 of the logic component includes a first set of values (the reference values) for technology node parameters (i.e., node geometry, foundry, and node variants), library groups (e.g., library vendors and number of tracks), and library variants (e.g., channel lengths and threshold voltages). For the parameters of PVT conditions, the reference design point also includes values corresponding to the first set of values of technology node parameters, library groups, and library variants. Often, these are standard values. For example, if the reference values for technology node parameters, library groups, and library variants are 45 nm TSMC HPM process technology with 8-track TSMC models operating at channel length of 45 nm and threshold voltage of 0.3V, the parameters for PVT conditions will include the nominal values associated with the 45 nm TSMC HPM process technology with 8-track TSMC models. In one embodiment, the nominal values for the PVT conditions of 45 nm TSMC HPM process technology with 8-track TSMC models are room temperature (e.g., 25 C), nominal supply voltage (e.g., 1V), and nominal process corner (e.g., typical process corner).

The trial design point used for estimating trial PPA of the logic component includes a second set of values (the trial values) for technology node parameters, library groups, and library variants. For the parameters of the PVT conditions, the trial design point uses the same values as the reference design point. For example, if the trial values for technology node parameters and library groups are 28 nm TSMC HPM process technology with 8-track TSMC models operating at channel length of 35 nm and threshold voltage of 0.2V, the parameters for the PVT conditions will include the nominal values associated with the 28 nm TSMC HPM process technology with 8-track TSMC models operating at channel length of 35 nm and threshold voltage of 0.2V. In one embodiment, the nominal values for the PVT conditions for these parameters are room temperature (e.g., 25 C), nominal supply voltage (e.g., 0.9V), and nominal process corner (e.g., typical process corner). Alternatively, the trial design point can use the nominal parameter values of the reference design point, as described above, for the PVT conditions.

Technology logic PPA database 292L is a subset of PPA database 290. The technology logic PPA database includes evaluated PPA metrics of technology logic test components at various design points. The design points at which the PPA metrics are evaluated include different values for technology node parameters (i.e., node geometry, foundry, and node variants), library groups (e.g., library vendors and number of tracks), and library variants (e.g., channel lengths and threshold voltages). For the parameters of the PVT conditions, the design points include standard values corresponding to each set of values of the technology node parameters and library parameters (i.e., library groups and library variants). Because technology logic scaling accounts for differences in the technology node parameters, library groups, and library variants, the technology logic PPA database typically does not need to include evaluated PPA values of the technology logic test components for the PVT conditions at other than standard values corresponding to a set of values of technology node parameters, library groups, and library variants.

The technology logic PPA database 292L includes evaluated PPA metrics for a plurality of technology logic test components. One method to choose the individual technology logic test components of the plurality of technology logic test components is to use a test component that is similar to the actual logic component in the IC design block, where similarity is determined based on a set of properties. An exemplary list of properties include logic depth, fanout, wire length per fanout, and the like. An exemplary list of technology logic test components can include: memory controllers such as double data rate (DDR) memory controller and direct memory access (DMA) controller, data encryption standard (DES) circuits, advanced encryption standard (AES) circuits, joint photographic experts group (JPEG) encoder, JPEG decoder, multiplier circuits such as a 32-bit multiplier, universal asynchronous receiver/transmitter (UART) peripheral, and synchronous serial peripheral. It is understood that additional and/or alternate circuits to that of the above-referenced exemplary list of technology logic test components can be added to the plurality of technology logic test components.

The technology logic PPA database is generated by characterizing various technology logic test components at different design points. One method of characterizing the technology logic test components is by starting with an RTL design of the technology logic test component, synthesizing the RTL design and performing a layout using conventional electronic design automation (EDA) tools such as Talus by Synopsys™. In one embodiment, each technology logic test component is characterized by evaluating its PPA metrics at different design points of the design space. An exemplary technology logic test component, a DDR controller, can have PPA metrics for power, performance, and area. The PPA metrics can be evaluated at design points that sample a large design space, a smaller design space or a portion of a design space. For example, when the technology is fixed as TSMC 28 nm, the number of variable design parameters is reduced.

The technology logic scaling process begins by identifying 410 which technology logic test component(s) will be used to evaluate the received logic component. This will be referred to as the equivalent technology logic test component. In one approach, the equivalence is determined by using logic parameters. Logic parameters for the received logic component are calculated. The calculated logic parameters can include, for example, a logic depth of the logic component, a fanout of the logic component, a wire length per fanout of the logic component, and the like.

The technology logic scaling module identifies 410 an equivalent technology logic test component based on the calculated logic parameters. In some embodiments, the module can compute a similarity factor between the received logic component and each of the technology logic test components by weighting different logic parameters of the received logic component. The module then uses the computed similarity score to identify an equivalent technology logic test component by, for example, selecting a technology logic test component that has the closest similarity score to the received logic component. In some embodiments, the module identifies two or more of the technology logic test components based on the similarity score. For example, the module can identify the technology logic test components with the two closest similarity scores and then apply a weighting factor for each. The received logic component is not the same as its equivalent technology logic test component.

Technology logic scaling module 372L accesses technology logic PPA database 292L for identifying the evaluated PPA metrics of the technology logic test components at the reference and trial design points. The module then determines a technology logic scale factor for the technology logic test component, for scaling from the reference design point to the trial design point. In one embodiment, the module uses the evaluated PPA metrics of the technology logic test component at the reference design point and at the trial design point to determine the technology logic scale factor of the technology logic test component. For example, the module identifies a first value for the evaluated PPA metric of the technology logic test component at the reference design point and a second value at the trial design point. The module then computes a ratio of the first and second values to determine the technology logic scale factor for the technology logic test component. For example, a ratio between first and second values of PPA metrics is 1.1.

The technology logic scale factor determined for the technology logic test component is then applied to the reference PPA of the received logic component to generate an estimated technology trial logic PPA of the logic component at the trial design point. For example, if the reference area PPA for the logic component is 1000 $\mu m^2$ and if the technology logic scale factor is 1.1, the estimated technology trial logic area PPA of the logic component at the trial design point is 1100 $\mu m^2$ (i.e., 1000 multiplied by 1.1). As another example, if the reference performance PPA (e.g., operating frequency) for the logic component is 1 GHz and if the technology logic scale factor is 1.2, the estimated technology trial logic performance PPA of the logic component at the trial design point is 0.833 GHz (1 GHz divided by 1.2).

Figure 5:
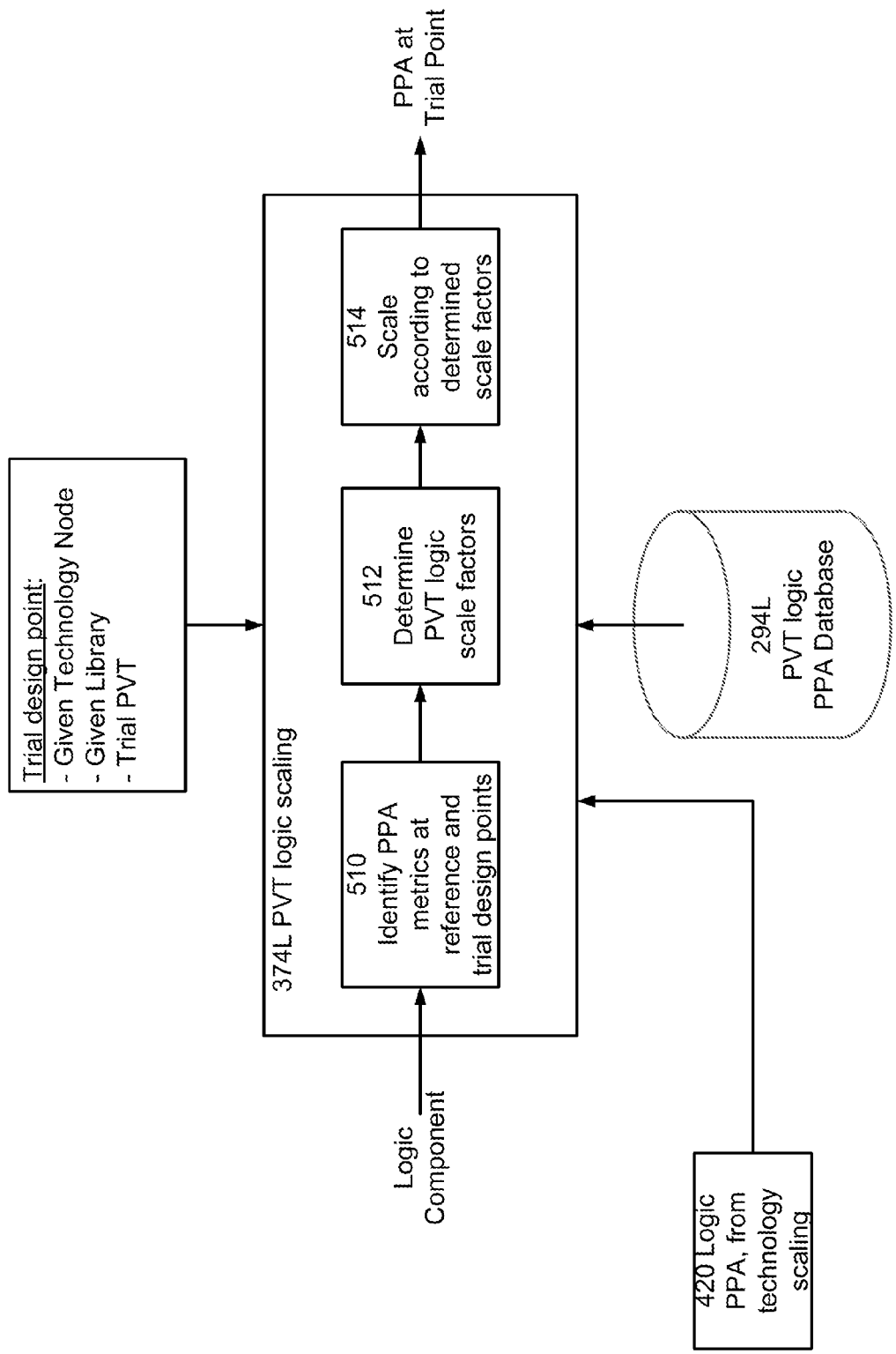
FIG. 5 is a block diagram of the PVT logic scaling shown in FIG. 3, according to one embodiment.

FIG. 5 is a block diagram of the PVT logic scaling shown in FIG. 3, according to one embodiment. PVT logic scaling module 374L receives the logic component to estimate component-level trial logic PPA metric for the logic component at a trial design point. The PVT logic scaling module estimates the component-level trial logic PPA metric by referring to PVT logic PPA database 294L. The module also receives a PPA metric 420 that is the estimated technology trial logic PPA metric by the technology logic scaling module for the received logic component.

In one embodiment, PVT logic scaling accounts for differences in the operating conditions (i.e., PVT conditions). Technology logic scaling, as described above with reference to FIG. 4, accounts for differences in technology node parameters (i.e., node geometry, foundry, and node variants), library groups (e.g., library vendors and number of tracks), and library variants (e.g., channel lengths and threshold voltages). In other words, technology logic scaling first performs scaling of the logic components over technology node parameters, library groups, and library variants, and PVT logic scaling then performs scaling over PVT conditions.

The received PPA metric 420 is an estimated technology logic PPA metric for the logic component at the trial design point. The various parameters of the design point associated with the PPA metric 420 are the same as the trial design point used in technology logic scaling module 372L. The parameters include the trial values (described above with reference to FIG. 4) for technology node parameters, library groups, and library variants, and standard (or nominal) values for the PVT conditions. For example, as described above with reference to FIG. 4, if the trial values for technology node parameters, library groups, and library variants are 28 nm TSMC HPM process technology with 8-track TSMC models operating at a channel length of 35 nm and threshold voltage of 0.2V, the parameters for the PVT conditions include the nominal values associated with these parameters, such as room temperature (e.g., 25 C), nominal supply voltage (e.g., 0.9V), and nominal process corner (e.g., typical process corner).

The trial design point of the PVT logic scaling used for estimating trial PPA of the logic component includes the same trial values for technology node parameters, library groups, and library variants as used in the trial design point for technology logic scaling. The trial design point of the PVT logic scaling includes trial values for the parameters of the PVT conditions. For example, for the second set of values for technology node parameters, library groups, and library variants of 28 nm TSMC HPM process technology with 8-track TSMC models operating at a channel length of 35 nm and threshold voltage of 0.2V, the parameters for the PVT conditions will include trial values for temperature, supply voltage, and process corner.

PVT logic PPA database 294L is a subset of PPA database 290. The PVT logic PPA database includes evaluated PPA metrics of PVT logic test components at various design points. The PVT logic test components that are used in generating the PVT logic PPA database include different test components for different sets of technology node parameters, library groups and library variants. For example, for a 28 nm TSMC HPM process technology with 8-track TSMC models, a NAND logic gate implemented in 28 nm TSMC HPM process technology with an 8-track TSMC library is the selected PVT logic test component. For a 45 nm TSMC LP process technology with 8-track TSMC models, a NAND gate implemented in 45 nm TSMC LP process technology with an 8-track TSMC library is the selected PVT logic test component. Accordingly, there can be a different PVT logic test component for each combination of technology node parameters, library groups, and library variants. In some embodiments, logic gates other than a NAND gate such as a NOR gate can be used as PVT logic test components. Alternatively, PVT logic test components can be implemented at a MOS transistor level as well.

The design points at which the PPA metrics of the PVT logic PPA database are evaluated include different values for technology node parameters, library groups, library variants, and PVT conditions. One method of generating the PVT logic PPA database is to first identify the number of unique PVT logic test components (e.g., F) that are needed based on the number of unique combinations of technology node parameters, library groups, and library variants. For example, there can be F number of 2-input NAND gates. In such exemplary embodiment, each of the F number of NAND gates is evaluated at different combinations of parameters associated with the PVT conditions. Given that there are three parameters associated with the PVT conditions (i.e., process corner, supply voltage, and temperature), each NAND gate might be evaluated $N^3$ times, where N is the number of possible values for each of the three parameters. Additional logic parameters such as fan-out can also be used to evaluate the PVT logic components.

The PVT logic PPA database is generated by characterizing various PVT logic test components at different design points. One method of characterizing the logic test components (e.g., NAND gate) is by simulating the NAND gate to evaluate its PPA metrics at different design points. The PPA metrics that are evaluated can include, for example, delay, slew rate, active power consumption, leakage power consumption, and area. Each of the above-listed NAND gate PPA metrics is evaluated for various values of parameters associated with the PVT conditions. For example, NAND gate PPA metrics can be evaluated at different junction temperatures, process corners, supply voltage, and fanout.

The PVT logic scaling process begins by the PVT logic scaling module selecting an appropriate PVT logic test component (e.g., an appropriate NAND gate) based on the given technology node parameters, library group parameters, and library variant parameters of the trial design point used for technology logic scaling. The module then accesses the PVT logic PPA database to identify 510 PPA metrics of the selected NAND gate from the PVT logic PPA database 294L. The module identifies PPA metrics for two sets of values for the parameters of the PVT conditions. The first set of values corresponds to the standard (or nominal) values of the parameters of the PVT conditions associated to the received PPA 420 from the technology logic scaling. The second set of values corresponds to the trial values of the parameters of the PVT conditions associated with the trial design point.

The module then determines 512 a PVT logic scale factor for the NAND gate between the first set of values and the second set of values. For example, the module computes a ratio of the first and second values to determine the PVT logic scale factor for the logic test component. For example, a ratio between first and second values of PPA metrics might be 1.02.

The PVT logic scale factor determined for the logic test component is then applied to scale 514 the received technology logic PPA 420 of the logic component to generate an estimated trial logic PPA of the logic component at the trial design point. For example, if the received technology area PPA for the logic component is 1100 $\mu m^2$ and if the PVT logic scale factor is 1.02, the estimated trial logic area PPA of the logic component after PVT logic scaling at the trial design point is 1122 $\mu m^2$ (i.e., 1100 multiplied by 1.02). As another example, if the received technology performance PPA (e.g., operating frequency) for the logic component is 0.8 GHz and if the PVT logic scale factor is 0.97, the estimated trial logic performance PPA of the logic component after PVT logic scaling at the trial design point is 0.86 GHz (i.e., 0.833 divided by 0.97). The estimated trial logic PPA at the output of PVT logic scaling module is a trial logic PPA of the logic component after combining the technology logic scaling and the PVT logic scaling.

FIG. 6 is a screen shot 600 illustrating another application of PVT logic scaling, according to one embodiment. The screenshot includes a tool bar 610 that includes different options for a user. For example, tool bar 610 includes an option 612 for estimating Scale Factors. The scale factor calculator has options 620 to select a particular process technology (e.g., CLN28HPM), library vendor (e.g., TSMC), and number of tracks (e.g., 9). For a combination of selected values of options 620, the calculator also includes options 630 to select channel length (e.g., default value of 35 nm) and threshold voltage class (e.g., SVT, LVT, and ULVT for channel length of 30.6 nm) to enable the scaling module to select the appropriate NAND gate for determining the PVT scale factors. Options 630 also includes an option to select either power or frequency as the default PPA metric to be evaluated.

Options 630 further includes an input for a baseline PVT reference (e.g., FF process corner, 0.99V supply voltage, and 125 C temperature for power PPA) and a set of trial PVT conditions for which scale factors are to be calculated. In this screen shot, the trial PVT conditions are currently set the same as the PVT reference. After an appropriate NAND gate is selected, and inputs for baseline and trial PVT conditions are received, the scaling module calculates scale factors between the baseline PVT conditions and trial PVT conditions. The scaling module can calculate a scale factor for each of power, performance, and area metrics. In the exemplary screenshot, the scaling module depicts a scale factor for active power, leakage power, and frequency, which are all set to 1.0000 because the baseline and trial PVT parameters are currently set the same. In the actual optimization implementation, the scale factor calculation is performed by software. The user interface presented in the screenshot is intended primarily for design exploration for users.

Figure 7:
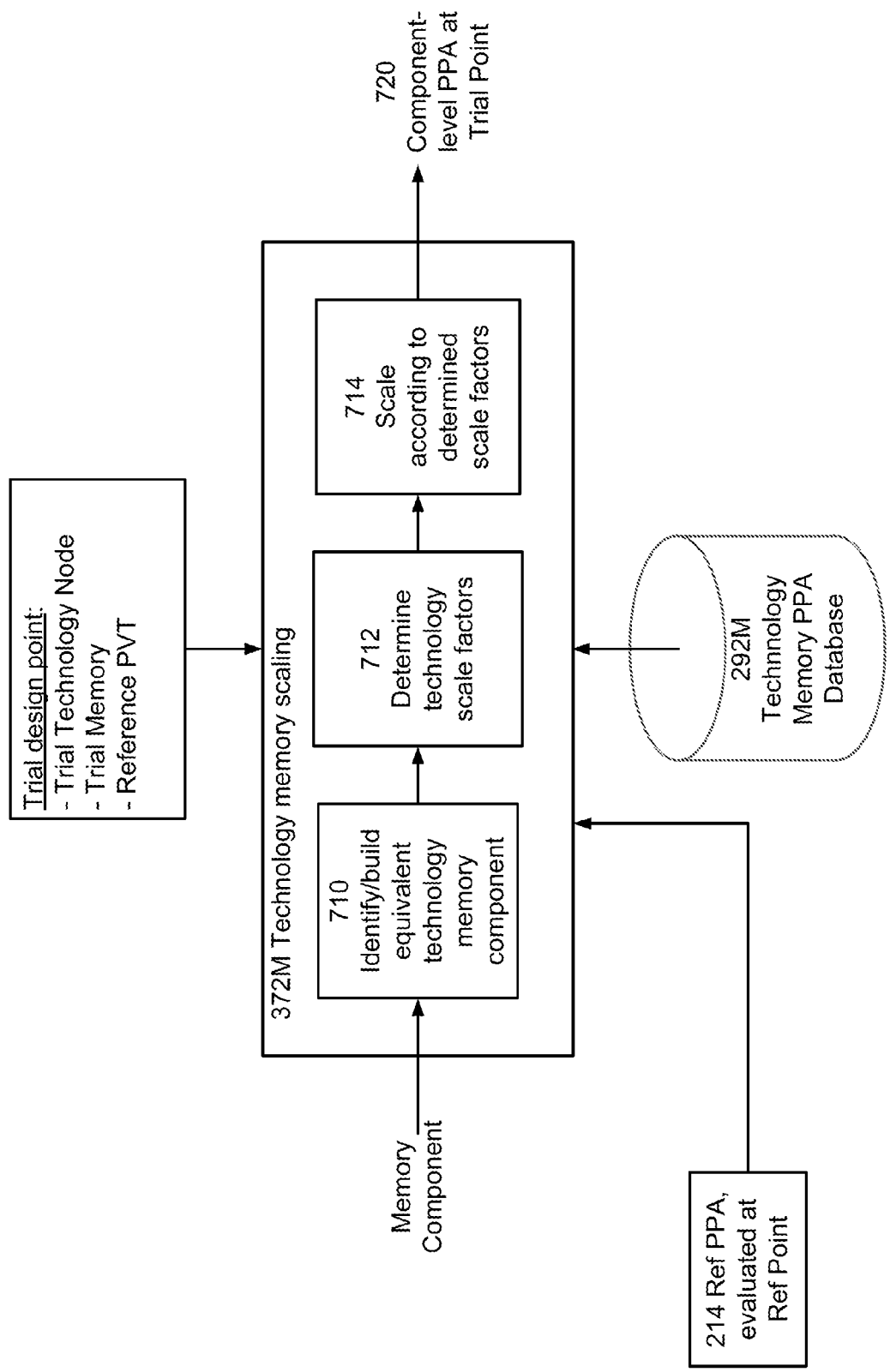
FIG. 7 is a block diagram of the technology memory scaling shown in FIG. 3, according to one embodiment.

FIG. 7 is a block diagram of the technology memory scaling shown in FIG. 3, according to one embodiment. Technology memory scaling module 372M receives a memory component to estimate component-level technology trial memory PPA metric for the memory component at a trial design point. The technology memory scaling module estimates the component-level technology trial memory PPA metric by referring to technology memory PPA database 292M. The module also receives a reference PPA metric associated with the received memory component that is based on the reference PPA 214.

The reference design point used in generating reference PPA 214 of the memory component includes a first set of values (the reference values) for technology node parameters (i.e., node geometry, foundry, and node variants) and memory parameters (e.g., memory compiler, memory description that includes number of read ports, number of write ports, type of memory (SRAM or register file), type of bit-cell used (high density of high speed), memory vendor, and other memory properties such column mux, redundancy, built-in-self-test, number of banks, power management, and the like). For the parameters of PVT conditions, the reference design point also includes values corresponding to the first set of values of technology node parameters and memory parameters. Often, the PVT conditions are standard values. For example, if the reference values for the technology node parameters and memory parameters are 45 nm TSMC HPM process technology with a single port read-write memory component with high density bit cell and a specific memory vendor, the parameters for PVT conditions will include nominal values associated with the 45 nm TSMC HPM process technology with a single port read-write memory with high density memory bit cell and the specific memory vendor. In one embodiment, the nominal values for these parameters are room temperature (e.g., 25 C), nominal supply voltage (e.g., 1V), and nominal process corner (e.g., typical process corner).

The trial design point used for estimating trial PPA of the memory component is analogous to the trial design point used for estimating trial PPA of the logic components described above with reference to FIG. 4, except that it uses memory parameters instead of library group and library variants. It includes a second set of values (the trial values) for technology node parameters and memory parameters. For the parameters of the PVT conditions, the trial design point uses the same values as the reference design point.

Technology memory PPA database 292M is a subset of PPA database 290. The technology memory PPA database includes evaluated PPA metrics of technology memory test components at various design points. The technology memory test components include a set of predefined memory test components that are evaluated and their PPAs stored in the PPA database 292M. If a test component is identical to the memory component being analyzed, that particular test component is selected. Otherwise, the optimization engine creates or builds in real-time a memory test component that matches the memory component being optimized and estimates its PPA values in real-time as well. These PPA values are initially used for technology memory scaling of the memory component. Simultaneously, the engine launches a simulation to evaluate PPA metrics for all combinations of the memory component's parameters and updates the PPA database.

The technology memory PPA database is generated by characterizing various technology memory test components at different design points. One method of characterizing the technology memory test components is analogous to the method described above with reference to technology logic test components. One difference between technology logic test components and technology memory test components is that while logic test components are typically not the same as the logic component being optimized, memory test components typically are identical to the memory component being optimized. In one embodiment, each memory component has numerous implementations based on the parameters associated with the memory. Each parameter has two or more values associated with it, resulting in n1.n2.n3 ... nm combination, where $n_i$ is the number of values associated with the ith memory parameter and there are m parameters. Each one of these combinations can be a trial design point for the memory component.

The technology memory scaling process begins with an identification (or building) of a candidate memory from the technology memory PPA database 292M that is equivalent to the memory component being optimized. In 710, the characteristics of the memory component are used to identify or build the memory test component. Only those candidate test components that match the properties of the memory component being optimized are considered. For example, if the memory component is a single port read write memory with 4096 words and 64 bits and no redundancy, and the target technology is TSMC 28HPM, step 710 will look for all memories in the database 292M that match these parameters. If none of the existing memory components of the database 292M match the memory component being optimized, the engine in real-time builds or creates a memory component that is identical to the memory component being optimized.

The technology memory scaling module accesses technology memory PPA database 292M for identifying the evaluated PPA metrics of the equivalent memory test component at the reference and trial design points. The module then determines 712 a technology memory scale factor for the technology memory test component, for scaling from the reference design point to the trial design point. In one embodiment, the module uses the evaluated PPA metrics of the technology memory test component at the reference design point and at the trial design point to determine the technology memory scale factor of the technology memory test component. For example, the module identifies a first value for the evaluated PPA metric of the technology memory test component at the reference design point and a second value at the trial design point. The module then computes a ratio of the first and second values to determine the technology memory scale factor for the technology memory test component. For example, a ratio between first and second values of PPA metrics might be 1.5.

The technology memory scale factor determined for the technology memory test component is then applied 714 to the reference PPA of the memory component to generate an estimated technology trial memory PPA of the memory component at the trial design point. For example, if the reference area PPA for the memory component is 2000 $\mu m^2$ and if the memory scale factor is 1.5, the estimated technology trial memory area PPA of the memory component at the trial design point is 3000 $\mu m^2$ (i.e., 2000 multiplied by 1.5). As another example, if the reference performance PPA (e.g., operating frequency) for the memory component is 1 GHz and if the memory scale factor is 1.25, the estimated technology trial memory performance PPA of the memory component at the trial design point is 0.8 GHz (1 GHz divided by 1.25).

Figure 8:
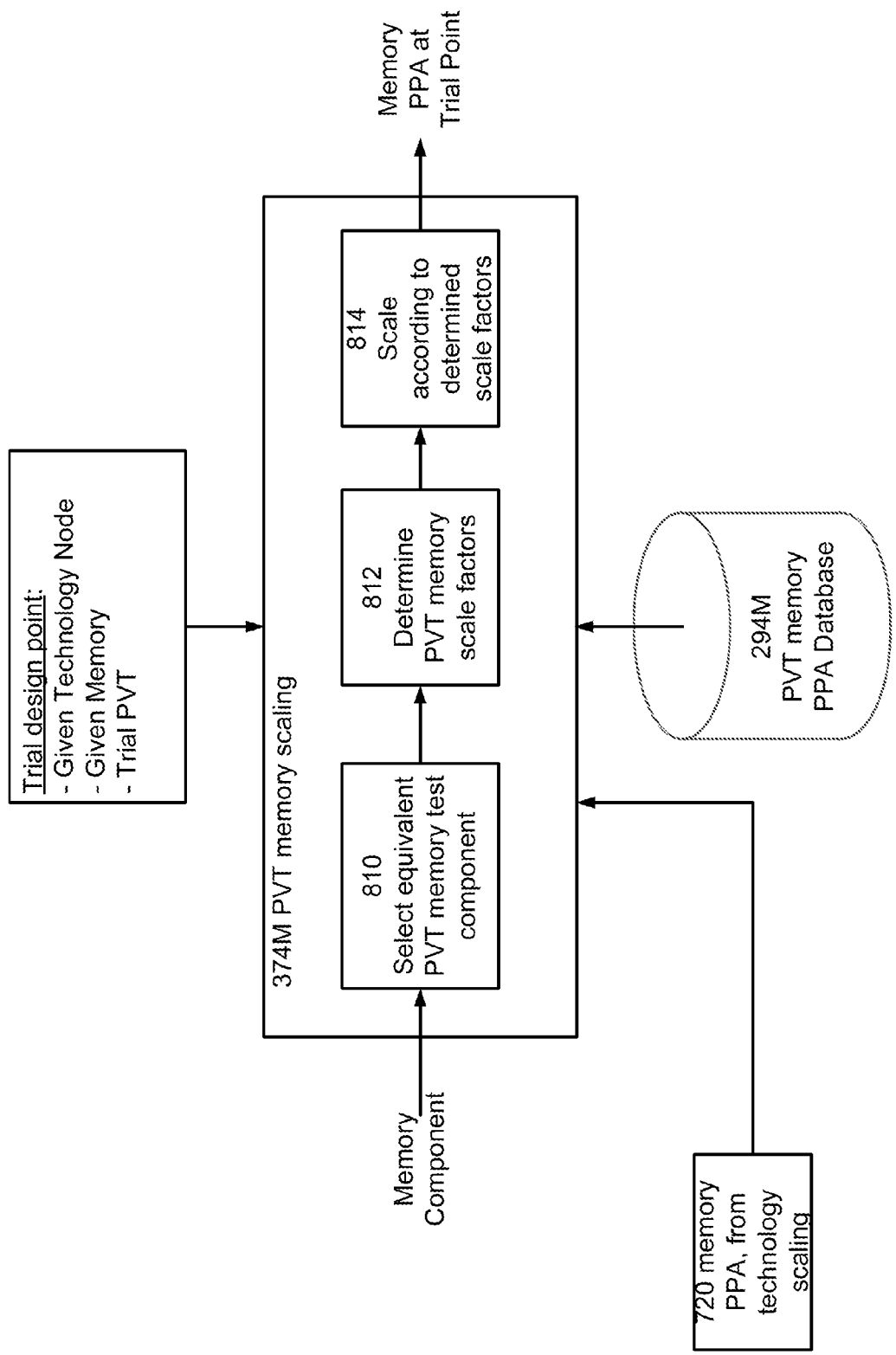
FIG. 8 is a block diagram of the PVT memory scaling shown in FIG. 3, according to one embodiment.

FIG. 8 is a block diagram of the PVT memory scaling shown in FIG. 3, according to one embodiment. PVT memory scaling module 374M receives the memory component to estimate component-level trial memory PPA metric for the memory component at a trial design point. The PVT memory scaling module estimates the component-level trial memory PPA metric by referring to PVT memory PPA database 294M. The module also receives a PPA metric 720 that is the estimated technology trial memory PPA metric by the technology memory scaling module for the received memory component.

In one embodiment, PVT memory scaling accounts for any differences in one or more of: process, voltage or temperature values (i.e., operating conditions or PVT conditions). Technology memory scaling, as described above with reference to FIG. 7, accounts for differences in technology node parameters and memory parameters. In other words, technology memory scaling first performs scaling of the memory components over technology node parameters and memory parameters, and PVT memory scaling then performs scaling over PVT conditions. A PVT memory scale factor calculator is used for calculating PVT memory scaling. This is analogous to the PVT logic scale factor calculator, but it uses the technology, memory bit cell and reference PVT as inputs to compute a scale factor for a target PVT.

The received PPA metric 720 is an estimated technology memory PPA metric for the memory component at the trial design point. The various parameters of the design point associated with the PPA metric 720 are the same as the trial design point used in technology memory scaling module 372M. Memory components and logic components use different parameters for design points. However they do share some parameters, and these common parameters will be used by the technology memory scaling module 372M. For example, memory and logic components share the technology node parameters. The parameters of the trial design point include the trial values (described above with reference to FIG. 7) for technology node parameters and memory parameters, and standard (or nominal) values for the PVT conditions.

The trial design point of the PVT memory scaling used for estimating trial PPA of the memory component includes the same second set of values for technology node parameters and memory parameters as used in the trial design point used for technology memory scaling. The trial design point of the PVT memory scaling includes trial values for the parameters of PVT conditions.

PVT memory PPA database 294M is a subset of PPA database 290. The PVT memory PPA database includes evaluated PPA metrics of PVT memory test components at various design points. The PVT memory test components that are used in generating the PVT memory PPA database include different test components for different sets of technology node parameters and memory parameters. Accordingly, there can be a different PVT memory test components for each combination of technology node parameters and memory parameters.

The design points at which the PPA metrics of the PVT memory PPA database are evaluated include all possible values for technology node parameters, memory bit cells, and PVT conditions. The memory bit cells used include bit cells for various combinations of memory compiler, memory vendor, and other memory parameters. In addition, the PVT logic PPA database 294M can include evaluated PPA metrics of memory peripheral logic that is used to access the memory array. Memories can be broken up into two sections—memory array and peripheral logic, where the peripheral logic is to access the memory array. PVT memory scaling is based on scaling both these memory components. PVT scaling for the memory peripheral logic uses the same technique as PVT logic scaling described above with reference to FIG. 5. However, PVT scaling for the memory array is based on simulations of the memory bit cell and is described below with reference to FIG. 8. Parameters for the bit cell include technology node, number of read-write ports in the bit cell, and the type of bit cell (high density or high speed).

One method of generating the PVT memory PPA database is to first identify the number of unique PVT memory test components (e.g., F) that are needed based on the number of unique combinations of technology node parameters and memory parameters. For example, there can be F number of memory bit cells. In such exemplary embodiment, each of the F number of bit cells is evaluated at different combinations of parameters associated with the PVT conditions. Given that there are three parameters associated with the PVT conditions (i.e., process corner, supply voltage, and temperature), each bit cell might be evaluated $N^3$ times, where N is the number of possible values for each of the three parameters. In one embodiment, a test memory circuit is designed to emulate a power consumption of the memory bit array, where the test memory circuit is designed based on the technology node parameters and memory parameters of the memory bit array. Each memory bit cell has a different corresponding memory test component for emulating power consumption of the bit array.

The PVT memory PPA database is generated by characterizing various PVT memory test components at different design points. One method of characterizing the memory test components (e.g., memory bit cell) is by simulating the bit cell to evaluate its PPA metrics at different design points. The PPA metrics that are evaluated can include, for example, read time, write time, active power consumption, leakage power consumption, and area. Each of the above-listed bit cell PPA metrics is evaluated for various values of parameters associated with the PVT conditions. For example, bit cell PPA metrics can be evaluated at different junction temperatures, process corners, and supply voltage.

The PVT memory scaling process begins by the PVT memory scaling module selecting 810 an appropriate PVT memory test component (e.g., an appropriate memory bit cell). The appropriate memory bit cell is selected based on the memory parameters for the memory component. The module then accesses the PVT memory PPA database to identify two sets of PPA metrics of the selected bit cell. The first set of values corresponds to the standard (or nominal) values of the parameters of the PVT conditions associated to the received PPA 720 from the technology memory scaling. The second set of values corresponds to the trial values of the parameters of the PVT conditions associated with the trial design point.

The module then determines 812 a PVT memory scale factor for the memory array based on the first set of values and the second set of values. For example, the module computes a ratio of the first and second values (e.g., 1.1) to determine the PVT memory scale factor for the bit cell. For the memory peripheral logic, a PVT logic test component is selected based on the channel length and threshold voltage of the devices used in the memory peripheral logic. When computing a memory power PPA, the power PPA is broken into two components—array and periphery. Each component is scaled separately and the results combined. The memory performance PPA is often dominated by the peripheral logic, so typically it is sufficient to perform PVT logic scaling of the peripheral logic to scale the memory component.

The PVT memory scale factor determined for the PVT memory test component is then applied to scale 814 the received technology memory PPA 720 of the memory component to generate an estimated trial memory PPA of the memory component at the trial design point. For example, if the received technology area PPA for the memory component is 3000 µm² and if the PVT memory scale factor is 1.1, the estimated trial memory area PPA of the memory component after PVT memory scaling at the trial design point is 3300 µm² (i.e., 3000 multiplied by 1.1). As another example, if the received technology power PPA (e.g., dynamic power) for the memory component is 1 mA and if the PVT memory scale factor is 1.2, the estimated trial memory power PPA of the memory component after PVT memory scaling at the trial design point is 1.2 mA (i.e., 1 multiplied by 1.2). The estimated trial memory PPA at the output of PVT memory scaling module is a trial memory PPA of the memory component after combining the technology memory scaling and the PVT memory scaling.

In some embodiments, the estimation engine can find all memory instances that meet or exceed the target memory PPA received for the memory portion of the IC design. One method of identifying all memory instances that meet or exceed the target memory PPA is to first identify a list of test memory components used in building the memory PPA database (i.e., 292M and 294M) by matching the properties of the memory component being optimized. Then for each identified test memory component, the method evaluates the trial PPA for a given target conditions and then select the optimal test component based on a given optimization criteria.

Figure 9:
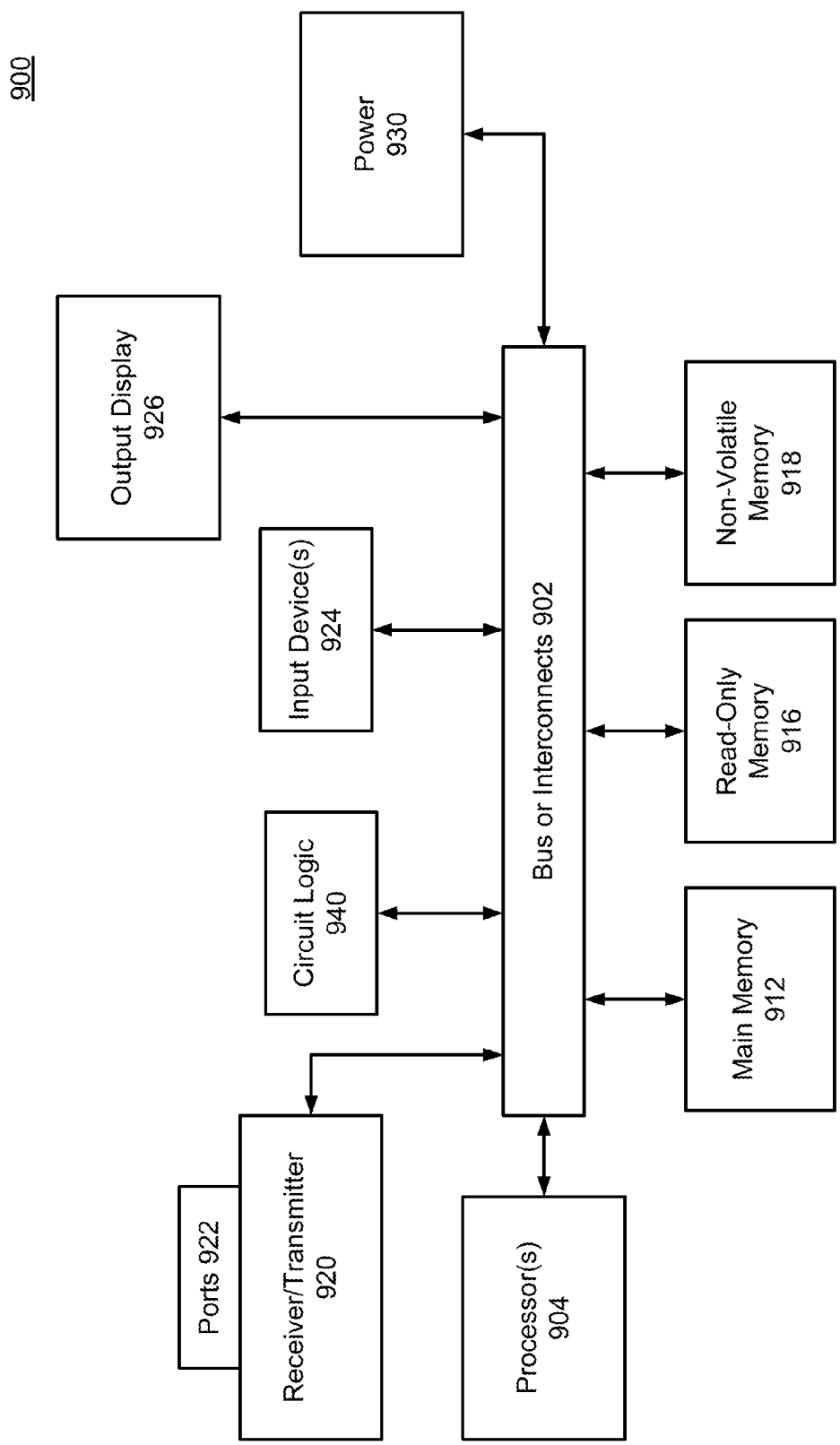
FIG. 9 is a block diagram of a special-purpose computing device that can optimize the IC design, according to one embodiment.

FIG. 9 is a block diagram of a special-purpose computing device that can optimize the IC design, according to one embodiment. In one exemplary embodiment, a non-transitory computer-readable medium (e.g., non-volatile memory 918) can store instructions which when executed implement the optimization process of the IC design. Alternatively, a representation of the IC design can be stored in the non-transitory computer-readable medium. The representation can be at a behavioral level, register transfer level, logic component level, transistor level, and layout geometry-level of the IC design.

In some embodiments, computer 900 comprises an interconnect or bus 902 (or other communication means) for transmission of data. Computer 900 can include a processing means such as one or more processors 904 coupled with bus 902 for processing information. Processors 904 can comprise one or more physical processors and/or one or more logical processors. While bus 902 is illustrated as a single interconnect for simplicity, it is understood that bus 902 can represent multiple different interconnects or buses. Bus 902 shown in FIG. 9 is an abstraction that represents any one or more separate physical buses, point to point connections, or both connected by appropriate bridges, adapters, controllers and/or the like.

In some embodiments, computer 900 further comprises a random access memory (RAM) or other dynamic storage device depicted as main memory 912 for storing information and instructions to be executed by processors 904. Main memory 912 can include an active storage of applications including a browser application for using in network browsing activities by a user of computer 900. Main memory 912 can further include certain registers or other special purpose memory.

Computer 900 can also comprise a read only memory (ROM) 916 or other static storage device for storing static information and instructions for processors 904. Computer 900 can further include one or more non-volatile memory elements 918 for the storage of certain elements, including, for example, flash memory, a hard disk, solid-state drive. Non-volatile memory elements 918 can store a representation of the IC design described above with references to FIGS. 2 through 8, or components within the IC design, can be stored as data. The representation can be at a behavioral level, register transfer level, logic component level, transistor level, and layout geometry-level of the IC design.

Computer 900 can comprise transceiver module 920 that is coupled to bus 902. Transceiver module 920 can further comprise a transmitter module and a receiver module. Transceiver module 920 comprises one or more ports 922 to connect to other devices (not shown).

Computer 900 can also comprise circuit logic 940 coupled to bus 902 and configured to detect information from a second device (not shown) coupled through ports 922. Computer 900 can also comprise output display 926 and coupled via bus 902. In some embodiments, display 926 can include a liquid crystal display (LCD) or any other display technology, for displaying information or content to a user, including three-dimensional (3D) displays. Alternatively, display 926 can include a touch screen that can also be part of input device 924. In some environments, display 926 can include an audio device, such as a speaker for providing audio information. Computer 900 can also comprise power device 930 that can comprise a power supply, a battery, a solar cell, a fuel cell, or other device for providing or generating power. Any power provided by power device 930 can be distributed as required to elements of computer 900.

While particular embodiments and applications of the present disclosure have been illustrated and described, it is to be understood that the embodiments are not limited to the precise construction and components disclosed herein and that various modifications, changes and variations may be made in the arrangement, operation and details of the method and apparatus of the present disclosure disclosed herein without departing from the spirit and scope of the disclosure as defined in the appended claims.

What is claimed is:

1. A method performed by a computer system for estimating a trial PPA metric for a memory component design evaluated at a trial design point, the method comprising:
   receiving the memory component design;
   receiving a reference PPA (power, performance, area) metric for the memory component design evaluated at a reference design point;
   accessing a PPA database that contains PPA metrics for test components evaluated at multiple design points;
   determining, by the computer system, a scale factor for the memory component, the scale factor based on:
      scaling from (a) the reference design point to (b) the trial design point, of an equivalent test component to the memory component; and
   applying the scale factor to the reference PPA metric to determine the trial PPA metric at the trial design point, wherein the memory component design is providable for subsequent design and manufacturing of the memory component.

2. The method of claim 1 wherein the PPA metric includes at least one of: dynamic power, leakage power, operating frequency, and die area.

3. The method of claim 1 wherein the trial design point and reference design point differ in technology node and/or memory vendor/memory compiler, and the scale factor for the memory component comprises a technology scale factor that accounts for differences in technology node and/or memory vendor/memory compiler.

4. The method of claim 3 wherein the technology scale factor further accounts for any differences in memory parameters between the trial design point and reference design point.

5. The method of claim 3 wherein the technology scale factor further accounts for differences in at least one of the following memory parameters: a parameter defining whether an output of the memory is pipelined or non-pipelined, a parameter defining read activity rate, a parameter defining write activity rate, a parameter defining a clock for the memory, a parameter defining a desired row/col option for the memory, a parameter defining whether to implement the memory with a flip-flop, a parameter defining whether to generate "X" unknown memory output read data, a parameter defining whether to generate "X" unknown memory output read data when read/write to a same memory address, a parameter defining whether to check read/write to a same address in the memory, a parameter defining whether to check for unknown write data bus, and a parameter defining whether to check for unknown read data.

6. The method of claim 3 wherein the equivalent test component to the memory component has the same memory parameters as the memory component with respect to number of words, number of bits, number of read ports, number of write ports, redundancy, and bit write.

7. The method of claim 6 wherein the equivalent test component to the memory component is the memory component itself.

8. The method of claim 3 wherein the trial design point and reference design point also differ in PVT conditions, and the scale factor for the memory component further comprises a PVT scale factor that accounts for differences in PVT conditions.

9. The method of claim 8 wherein the PVT scale factor of the memory component is determined based on: scaling of an equivalent PVT test component to the memory component.

10. The method of claim 9 wherein the equivalent PVT test component is determined based on the technology node and memory of the trial design point.

11. The method of claim 9 wherein the equivalent PVT test component is determined based on a memory bit-cell used to generate the memory component.

12. The method of claim 8 wherein the technology scale factor is applied to the reference PPA metric to obtain a trial technology PPA metric, and the PVT scale factor is applied to the trial technology PPA metric to obtain the trial PPA metric.

13. The method of claim 8 wherein the reference PPA metric is multiplied by the technology scale factor to obtain a trial technology PPA metric, and the trial technology PPA metric is multiplied by the PVT scale to obtain the trial PPA metric.

14. The method of claim 1 wherein the memory component comprises a memory array and a peripheral logic that accesses the memory array, and determining the scale factor for the memory component comprises determining a first scale factor for the memory array and a second scale factor for the peripheral logic.

15. The method of claim 14 wherein the reference PPA metric of the memory component is determined by applying the first scale factor to the memory array, applying the second scale factor to the peripheral logic, and combining the trial PPA metrics of the memory array and peripheral logic.

16. The method of claim 1 wherein the PPA database includes data associated with PPA metrics for the equivalent test component at design points for all technology nodes within a design space.

17. The method of claim 1 wherein the PPA database includes data associated with PPA metrics for the equivalent test component at design points for all memory vendors/memory compilers within a design space.

18. The method of claim 1 wherein the PPA database includes data associated with PPA metrics for the equivalent test component, the data sufficient to span all design points within a design space.

19. The method of claim 1 wherein the reference PPA metric is multiplied by the scale factor to determine the trial PPA metric.

20. A non-transitory computer-readable storage medium storing executable computer program instructions for estimating a trial PPA metric for a memory component design evaluated at a trial design point, the instructions executable by a processor and causing the processor to perform a method comprising:
receiving the memory component design;
receiving a reference PPA (power, performance, area) metric for the memory component design evaluated at a reference design point;
accessing a PPA database that contains PPA metrics for test components evaluated at multiple design points;
determining a scale factor for the memory component, the scale factor based on: scaling from (a) the reference design point to (b) the trial design point, of an equivalent test component to the memory component; and
applying the scale factor to the reference PPA metric to determine the trial PPA metric at the trial design point,
wherein the memory component design is providable for subsequent design and manufacturing of the memory component.

* * * * *